(12) United States Patent
Belgum et al.

(10) Patent No.: US 9,388,067 B2
(45) Date of Patent: Jul. 12, 2016

(54) PIPETTE PULLER USING SCANNING LASER

(75) Inventors: Jack Belgum, San Anselmo, CA (US); Dale Flaming, San Rafael, CA (US)

(73) Assignee: SUTTER INSTRUMENT COMPANY, Novato, CA (US)

( * ) Notice: Subject to any disclaimer, the term of this patent is extended or adjusted under 35 U.S.C. 154(b) by 1013 days.

(21) Appl. No.: 12/807,345

(22) Filed: Sep. 1, 2010

(65) Prior Publication Data

US 2012/0047955 A1 Mar. 1, 2012

(51) Int. Cl.
*C03B 23/043* (2006.01)
*C03B 23/047* (2006.01)

(52) U.S. Cl.
CPC ............. *C03B 23/043* (2013.01); *C03B 23/047* (2013.01)

(58) Field of Classification Search
CPC .............................. C03B 23/047; C03B 23/043
USPC ............................................. 65/108, 158, 271
See application file for complete search history.

(56) References Cited

U.S. PATENT DOCUMENTS

| | | | |
|---|---|---|---|
| 4,135,902 A | | 1/1979 | Oehrle |
| 6,144,007 A | * | 11/2000 | Levin .................. 219/121.62 |
| 6,252,196 B1 | * | 6/2001 | Costin et al. .......... 219/121.69 |
| 6,425,270 B1 | * | 7/2002 | Suzuki et al. ............... 65/379 |
| 6,732,562 B2 | | 5/2004 | Quick |
| 7,563,536 B2 | * | 7/2009 | Yamauchi et al. ........... 429/171 |
| 2004/0045322 A1 | * | 3/2004 | Stephen ....................... 65/392 |

* cited by examiner

*Primary Examiner* — Queenie Dehghan
(74) *Attorney, Agent, or Firm* — Kilpatrick Townsend & Stockton LLP (57) ABSTRACT

An apparatus and method for pulling tubular glass, such as pipettes, is disclosed. The invention is generally directed apparatus and techniques for precisely scanning a laser beam on the selected surfaces of the glass tube to uniformly, controllably and programmably soften the tube prior to and during pulling. The invention has application to both vertical and horizontal pullers.

4 Claims, 7 Drawing Sheets

PIPETTE PULLER USING SCANNING LASER

BACKGROUND OF THE INVENTION

1. Field of the Invention

The present invention is generally related to glass-pulling apparatus and methods, and is more specifically related to apparatus and methods for precision pulling of pipettes using a scanning laser.

2. Background

Various systems and methods for pulling pipettes are known in the art. Typically, they are used to reduce the diameter of a pipette by first softening a glass tube and then stretching it. For example, a pipette puller may start with a glass tube having an inside diameter of 1.0 mm and reduce the inner diameter at the tip of the pipette to a fraction of a micron. Glass micropipettes made in this manner are used in a myriad of scientific investigative techniques. Some uses of micropipettes are described in the inventor's prior U.S. Pat. No. 5,181,948, the disclosure of which is incorporated by reference. Various state-of-the-art commercial pipette pullers are available from Sutter Instrument Company, the assignee of the present invention; see, for example, the products listed at their website http://www.sutter.com.

Various heating techniques for softening the glass to be pulled are known in the art. In commercial embodiments, the glass tube (pipette) is typically heated using either a filament or a sufficiently high power laser, such as a $CO_2$ laser. A pulling force is applied to the pipette which stretches to a reduced diameter. There are two main design approaches that are used to apply the necessary pulling force: (1) horizontal systems (i.e., where the central axis of the pipette is maintained in a horizontal orientation) must have two clamping mechanisms and typically rely on a solenoid or spring loaded mechanism to pull the heated glass, and (2) vertical systems, (i.e., where the central axis of the pipette is maintained in a vertical orientation) and rely simply on a weight attached to the bottom end of the glass tube to exert a preselected (depending on the weight) downward pulling force. Vertical systems may also clamp the glass at two positions and may used additional means for applying force. A simple vertical system with a pull supplied by a weight allows the glass to be easily rotated in order to produce a uniform heating around the glass. It is difficult to do this effectively with a horizontal configuration because the two separate glass clamps must be rotated synchronously and the clamping of the two sides must fall perfectly on a common line. If there is any offset or angle between the line of one clamp and the other that offset will reverse relative to the glass when the clamps rotate by 180 degrees. In cases where the glass has drawn down to a small diameter and a small length of glass is soft, this reversal will destroy the pipette even if the magnitude of the misalignment is quite small.

As noted, a pipette pulling system is typically used to form with very small diameter, thin-walled micropipettes. Because of the tiny size of the micropipettes that are produced, very small variations in the process parameters can have profound affects on the resultant product, sometimes in seemingly unpredictable ways. Accordingly, the user's selection of parameters to meet his or her specific needs is often as much art as science.

While pipette pullers have been available for decades, there is a continued need for pipette pulling systems and methods with greater precision, control and reproducibility.

BRIEF SUMMARY OF THE INVENTION

In one aspect the present invention is directed to a pipette puller having a laser for generating a light beam for heating a pipette, an optical system for alternately scanning the laser beam in a first direction parallel to said central axis and in a second direction orthogonal to said central axis, whereby said pipette is heated and softened by said laser beam, and a force-applying mechanism for applying a pulling force on the softened pipette. In one embodiment, the laser is stationary and the optical system comprises rotatable mirrors to vary the position of the laser beam. The rotatable mirrors are preferably each connected to a galvanometer. The pipette puller may be maintained in a vertical position while it is pulled, using a weight to apply a pulling force. A position sensor may be used for determining the position of the weight while the pipette is being pulled. The optical system may be adapted to scan the laser beam on at least two paths that are parallel to but offset from said central axis. A control system may be used for controlling the optical system, the laser and the rotation mechanism. The control system preferably has a user interface for receiving user-selected parameters.

In another aspect the present invention is directed to a method of pulling a pipette by scanning a laser beam in a path in a first direction parallel to the central axis of the pipette, the path being offset from the central axis of the pipette, and further scanning the laser beam in a second direction orthogonal to said central axis, such that a portion of the pipette is softened by said laser beam, applying a force to the softened pipette such that a portion of said pipette is stretched after the pipette is softened. The offset preferably alternates between first and second sides of the central axis of said pipette. In a further aspect, the parameters of the laser scan in change as the pipette is pulled. The scans may define a scan center which is moved as the pipette is pulled. Moreover, the offset between the center axis of the pipette and the scan in the first direction changes as the pipette is pulled.

DETAILED DESCRIPTION OF THE INVENTION

The present invention is directed to systems and methods for pulling glass pipettes (i.e., small diameter hollow glass tubes) and similar articles to reduce the diameter. As used herein the term "glass" is intended to be broadly construed and includes, for example, fused silica (quartz). While the invention is described in connection with pipettes, which is believed to be its principal use, the systems and methods also have application to pulling solid glass rods, including, for example, rods used to form fiberoptic waveguides having concentric inner and outer portions formed from different glasses.

Figure 1:
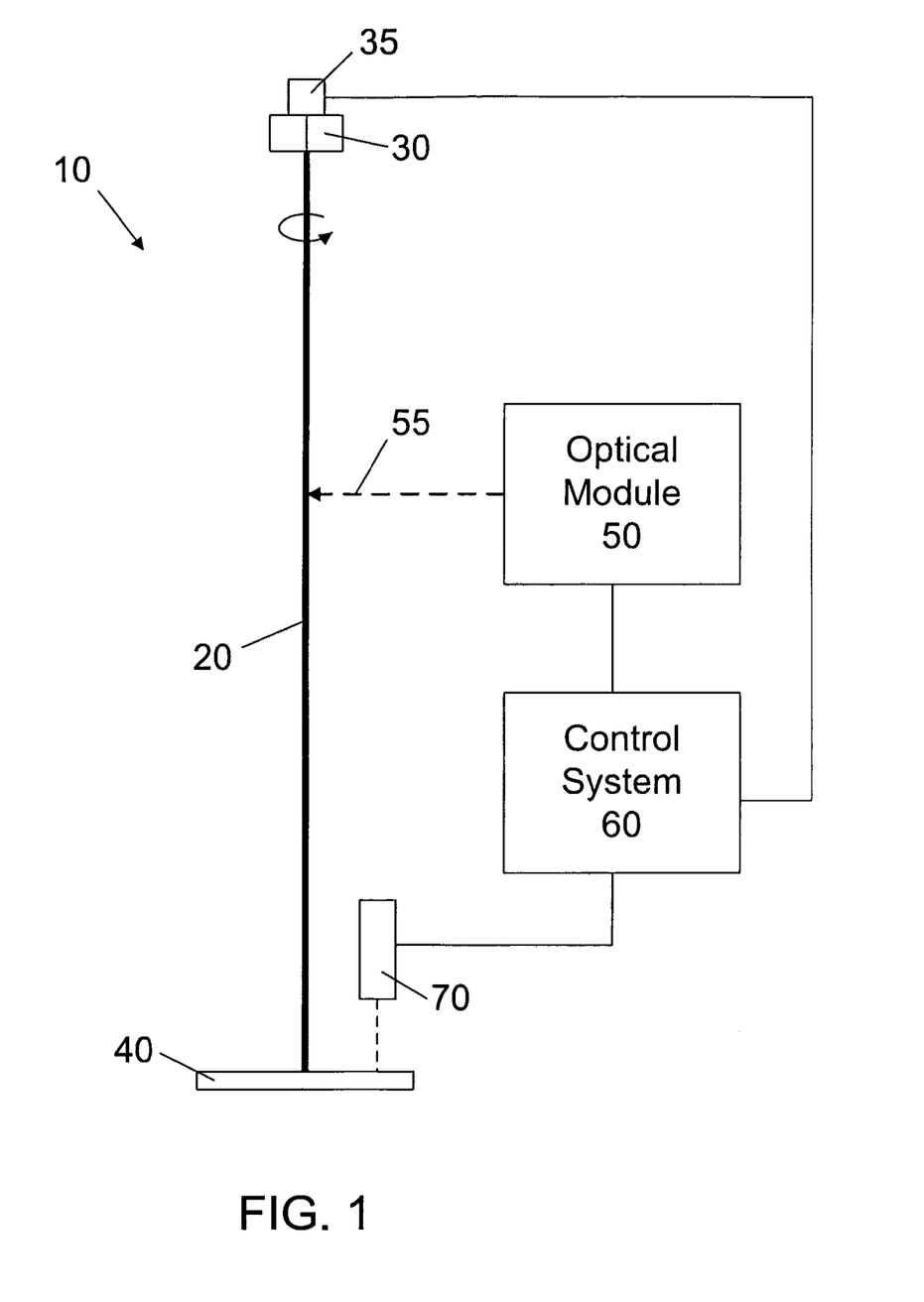
FIG. 1 is a schematic representation of a first embodiment of the present invention.

FIG. 1 is a schematic depiction of an apparatus or system 10 according to a first embodiment of the present invention. System 10 is a "vertical" system, i.e., pipette 20 is held in a vertical position. At its upper (top) end pipette 20 is held by a collet clamp 30, which is rotated by a motor or other suitable mechanism 35, and at its lower (bottom) end, pipette 20 is attached to a weight 40, which acts as a pulling force. In one embodiment, weight 40 is preferably disk shaped as depicted. Accordingly, in the system of FIG. 1, the glass draws only from the bottom end. A relatively high power laser, such as a $CO_2$ laser, and a related optical system, the combination of which is depicted in FIG. 1 as optical module 50, are used to scan a laser beam 55 onto pipette 20, causing it to soften. The softened pipette is then pulled to a reduced diameter under the force of weight 40. Typically, the pulled pipette, which has a generally hourglass shape, is then cut into two pieces, each of which has a narrow tip. The tip may then be subject to additional polishing, beveling, etc. to make it suitable for its intended use. Techniques for cutting, polishing and beveling pulled pipettes are well known and need not be described as they are not part of the present invention.

Figure 2:
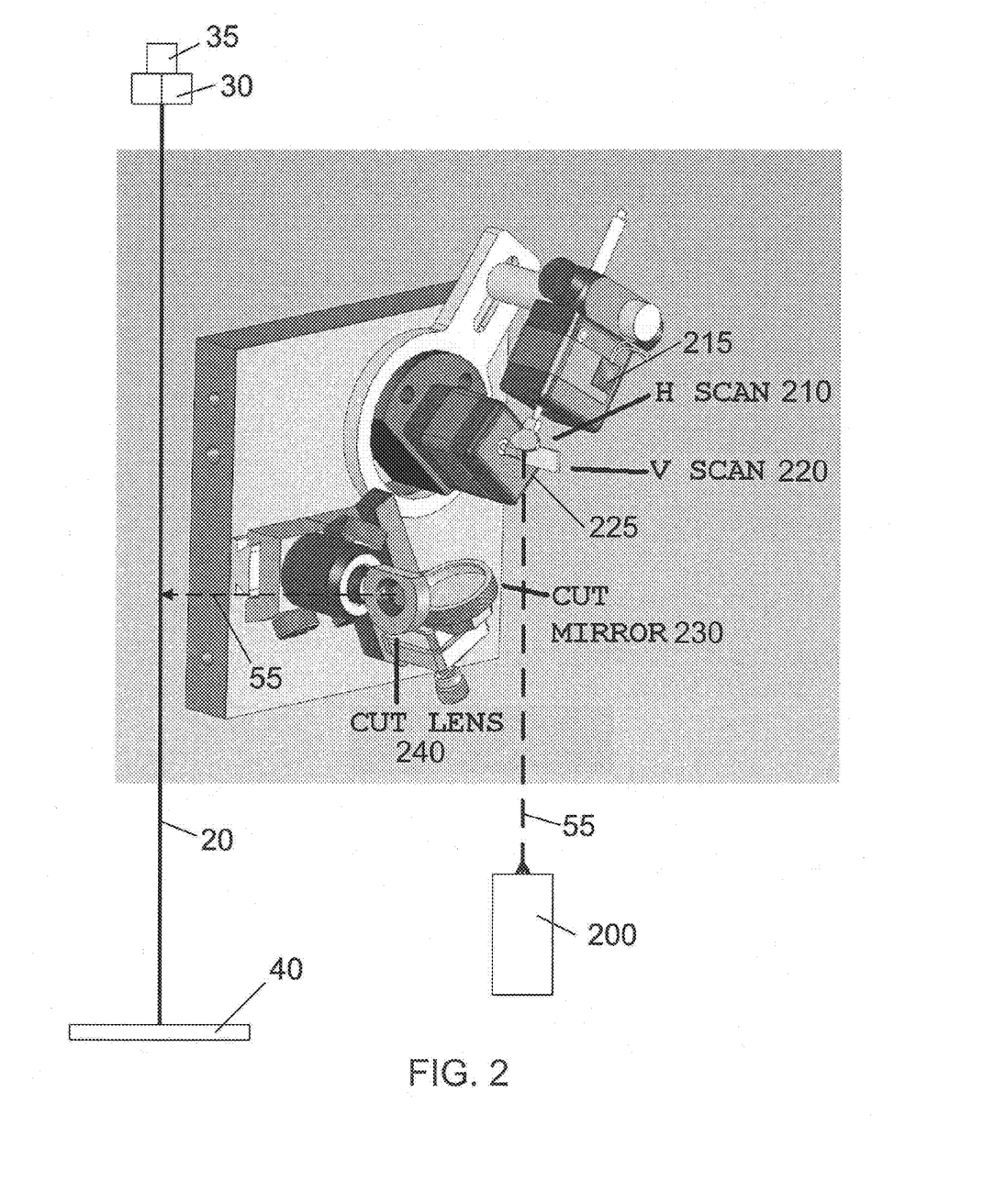
FIG. 2 is a partially schematic perspective view of the optical system for scanning a laser beam onto a pipette in accordance with a first embodiment of the present invention.

Motor 35 and the components in optical module 50, which are described below in connection with FIG. 2, are operated by control system 60, comprising a microprocessor or other computing device, volatile and non-volatile memory, system software, and peripheral devices. Control system may be a computer comprising a monitor for displaying a graphical user interface and one or more input devices for accepting user inputs. (Alternatively, 10 may be a stand alone device with a control port that is connected to a stand alone computer with appropriate system control software.) A position sensor 70, also coupled to control system 60, monitors the vertical position of weight 40 and, thereby, is used to precisely monitor the stretching (pulling) of pipette 20. In addition, the position sensor can be used to provide a fault test to ensure that the glass and the weight have been properly installed prior to heating and pulling. In one embodiment of the present invention, a SUNX® LM10 Series "Micro Laser Sensor" is used, and the analog output of the sensor is read by a 10 bit (1024 count) ADC for use by control system 60. The aforementioned laser sensor is accurate to within 10-15 microns. However, any suitable mechanism may be used to monitor pulling of the pipette.

According to a preferred embodiment of the present invention, laser beam 55 is scanned both vertically and horizontally as it heats pipette 20. FIG. 2 is a partially schematic perspective view of the optical system for scanning laser beam 55 on pipette 20. Beam 55 from laser 200 is aligned with horizontal ("H") scanning mirror 210. For clarity, only the initial and final portions of the path of beam 55 are shown. H scanning mirror 210 is rotatable about its axis by controlling the voltage applied to galvanometer 215. The beam reflected off of H scanning mirror 210 is then incident on vertical ("V") scanning mirror 220. V scanning mirror 220 is, likewise, rotatable about its axis by controlling the voltage applied to galvanometer 225. (While galvanometers are preferred for their high speed and accuracy, other rotary actuators, such as servo or step motors could, alternatively, be used.) Beam 55 then propagates to pipette 20. Briefly, the angular deflection of each galvanometer, and hence of H and V scanning mirrors 220 and 230, is determined by a analog feed signal fed into the galvanometer from a DAC, which converts the digital control signal from control system 60 to the analog signal. In one embodiment, a 12 bit (4096 count) DAC is used. A lens or curved mirror (not shown) could be used to focus the laser beam if needed. Ideally a focusing lens or mirror would be located before the scanning mirrors and would have a long enough focal length so that the focus relative to the glass would not be significantly changed by the vertical scan.

Control system 60, using data from position sensor 70 determines the position of the pipette. This information is used, in combination with the user's input to define the path of beam 55. Thus, beam 55 can be scanned both horizontally and vertically along a preselected portion of pipette 20 by controlling galvanometers 215 and 225 respectively. The system is designed so that very small rotations of mirrors 210 and 220 are required, thereby allowing the beam position to be changed very rapidly. The galvanometers, and hence the beam motion, are controlled by control system 60 which, preferably, allows the user to specify the desired parameters using a graphical user interface, and translates the specified parameters into control signals to the galvanometers. Preferably, the control system software also incorporates built-in recipes which can be used or modified, as desired, by the user. Finally, fixed mirror 230 and optional lens 240 are used to cut pipette 20 after it has been pulled to the desired length, by focusing the beam at a desired location.

Figure 3:
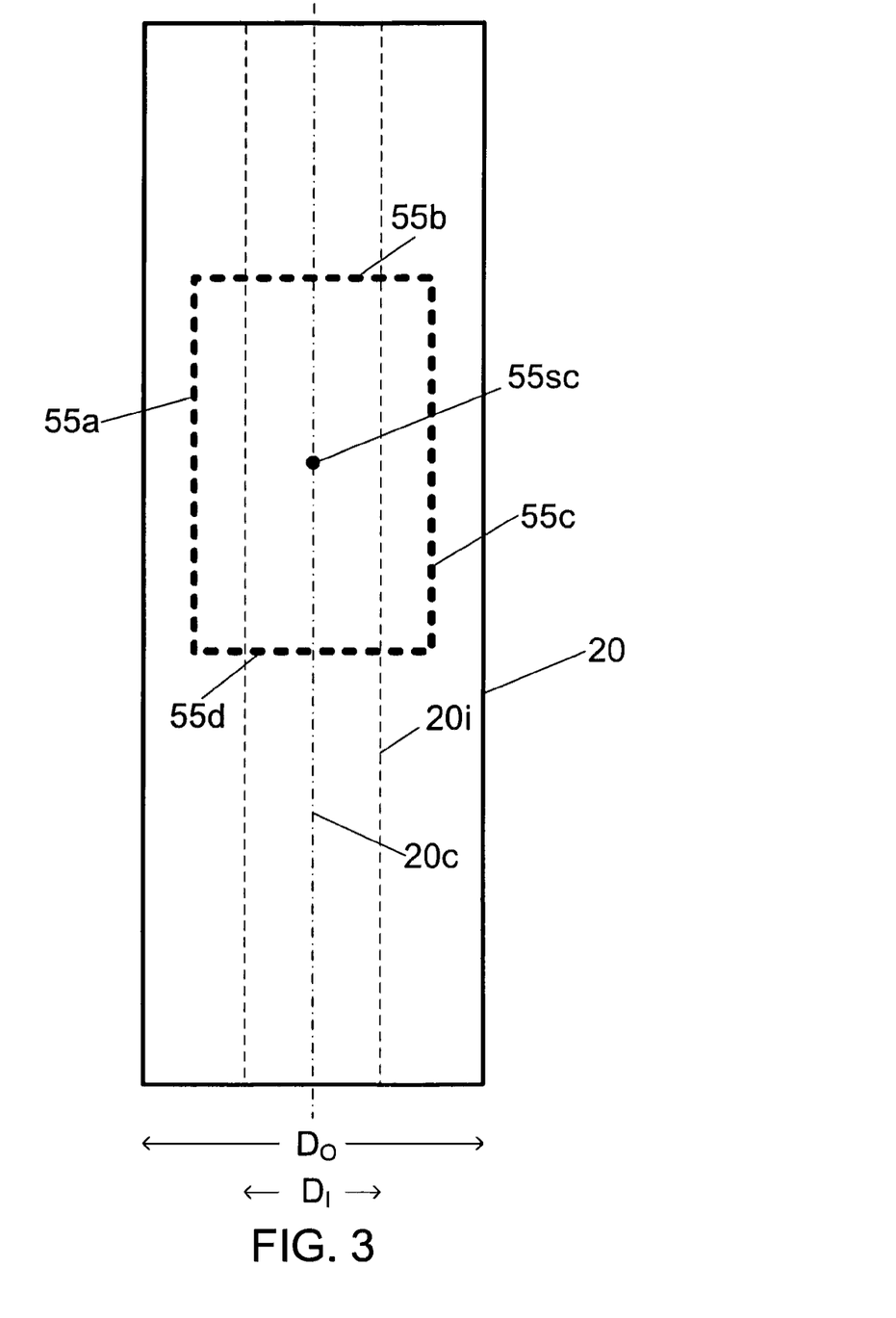
FIG. 3 is a schematic diagram showing the path of a laser beam as it is scanned over the surface of a pipette in accordance with one embodiment of the present invention, at a time prior to pulling the pipette.

FIG. 3 is a schematic diagram showing the path of beam 55 as it is scanned over a portion of the surface of pipette 20 in accordance with one embodiment of the present invention. FIG. 3 shows a greatly enlarged view of the pipette in its initial state before the glass has been softened and stretched. As depicted in FIG. 3 pipette 20 has an outer diameter $D_O$ and an inner diameter $D_I$ defined by inner wall $20_I$. Pipette 20 further has a central axis $20_C$. In accordance with the embodiment depicted, beam 55 is scanned sequentially in a rectangular Pattern along path 55a, 55b, 55c and 55d, such that the beam path alternates between vertical and horizontal movements. Thus, vertical and horizontal scans are combined so that one complete scan sequence comprises two parallel vertical scans that are offset from central axis $20_C$. Specifically, the sequence starts with a vertical scan 55a in one direction followed by a horizontal step move 55b. Beam 55 is then returned to the original position by a vertical scan 55c in the reverse direction and then a horizontal step 55d back to the original position. Preferably control system 60 allows user selection of the horizontal step size and the horizontal center position. The scanning motion of the beam, along with rotation of the pipette, evenly heats and softens a selected portion of the pipette.

Note that beam path 55 depicted in FIG. 3 corresponds to the position of the center of the laser beam as it is scanned, such that the beam center is offset from central axis $20_C$ while the beam is scanned vertically up or down. While laser beam 55 has a well defined width, which may be adjusted by lens 240 (see FIG. 2), the beam has a substantially Gaussian intensity distribution that is maximum at the beam's center. Thus, although the beam is wider than the line depicting path 55a, 55b, 55c, 55d, the line corresponds to the location of greatest beam intensity. The path of the beam 55 defines a generally rectangular heating zone having vertical and horizontal dimensions that extend beyond the illustrated path of the beam center. As used herein, the center of the heating zone 55sc is sometimes referred to herein as the scan center, as the heat is evenly distributed about this point.

Figure 4:
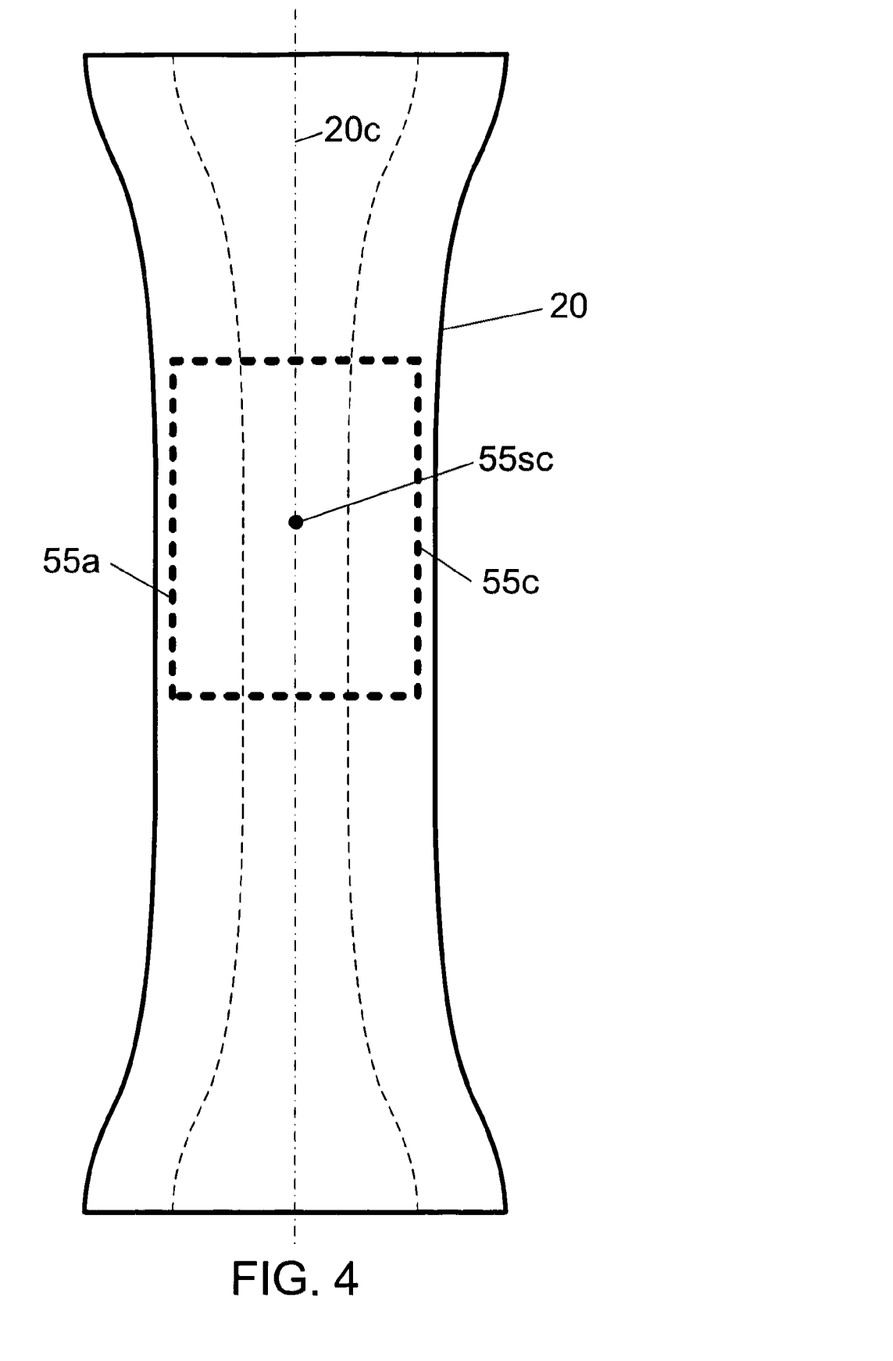
FIG. 4 is a schematic diagram showing the path of a laser beam as it is scanned over the surface of a pipette in accordance with one embodiment of the present invention, at a time after pulling of the pipette has begun.

FIG. 4 is the same as FIG. 3, but at a later point in time after pipette 20 has been softened and has started to stretch under the pulling force of weight 40 (see FIGS. 1 and 2). As depicted, the stretching of pipette 20 causes a narrowing of its inner and outer diameters as it is pulled. (It will be appreciated by those skilled in the art that the reduction in pipette diameter will be far more pronounced that what is shown in FIG. 3.) Note that as the pipette diameter narrows, the vertical path of laser beam 55 becomes closer to the edge of the pipette. As discussed above, path 55a, 55b, 55c, 55d, corresponds to the center of the laser beam. Accordingly, a substantial portion of the laser beam (i.e., much of the beam outboard of the beam center) is no longer incident on the pipette when the beam is moving vertically. Thus, in the embodiment depicted in FIG. 4, heating of the pipette is reduced once the pipette begins stretching. As described below, this can be used to obtain advantageous effects, or the width of the horizontal scan may be adjusted to compensate for the narrowing of the pipette.

If the vertical scan range and scan center 55sc remain in a fixed in position, the process of drawing the glass will cause hot glass near the bottom of the zone of heating to move out of the heating zone, as shown in FIG. 4. The glass that draws out of the heating zone cools quickly and becomes rigid again, remaining at the same diameter for the rest of the draw. As the draw continues the glass remaining in the heating zone continues to be heated by the laser such that more and more of it also draws out of the zone of heating. In such a case, the minimum diameter of the pulled pipette will usually occur at a point that contains the glass that was within the zone of heating for most, if not all, of the period of heating. With a fixed scan position the result is that the waist of the taper is usually located close to the shoulder of the upper piece. In order to produce a long, continuous positive taper with a heat source fixed in position the heat source must be of extended length.

Figures 5A, 5B:
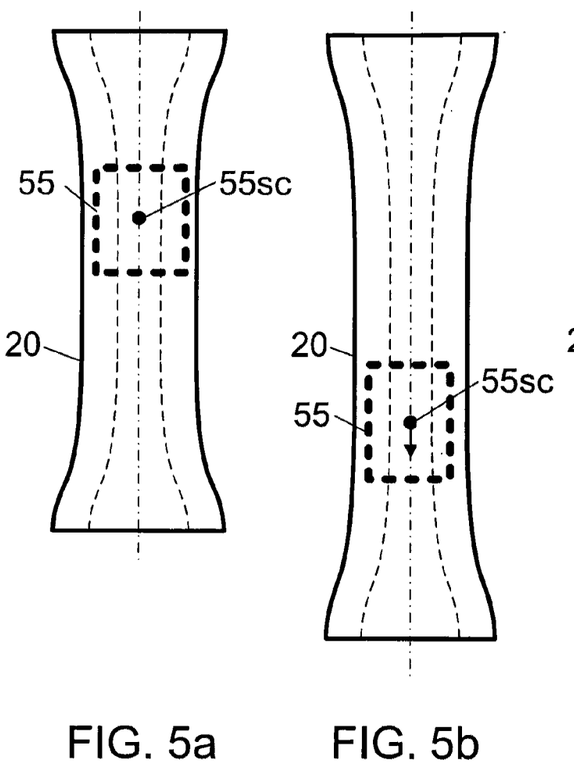
FIGS. 5a-5c schematically depict different relative motions between a pipette being drawn in accordance with an embodiment of the present invention and the center of the laser scan used to heat the pipette.
Figure 5C:
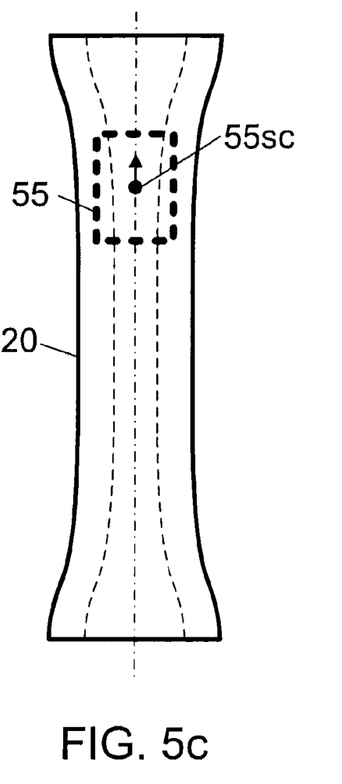

One of the advantages of the scanned laser of the present invention is that it can be rapidly repositioned along the pipette. Position sensor 70 provides a signal that indicates the displacement of the weight as the glass draws. This signal is read by an ADC coupled to control system 60 such that the control system receives the digitized displacement signal and uses this in combination with the scale factor to determine the position of the scan center. By appropriately selecting the scale factor dramatic changes can be made in the operation of system 10. Examples are shown schematically in FIGS. 5a, 5b and 5c. In FIG. 5a, the scan center remains fixed, in FIG. 5b, the scan center moves downward (follows) as the glass is drawn, and in FIG. 5c, the scan center is moved upward as the glass is drawn. Each of these can be implemented by choice of an appropriate scale factor, and can be used to produce different glass shapes. For example, if the scan center follows the glass as it draws and is locked in position relative to the moving lower portion of the glass, the taper associated with a fixed scan center can be reversed. Likewise, if the scan center moves downward at one half the speed of the draw, the top and bottom portions will have similar tapers. If scan center is moved upward, the system will act like a redraw system.

The inventor has determined that by scanning the beam horizontally and vertically, with the beam center offset from central axis $20_C$, better and more controllable results are obtained. Previously, it was believed that the correct approach was to use a purely vertical scan with a beam center that is aligned as closely as possible to pipette central axis $20_C$. Accordingly, prior art devices did not have the ability to horizontally scan the laser beam. However, it was discovered by the inventor that when the laser was centered on the glass it was difficult to keep the draw concentric, and that it was also difficult to avoid rapid, uncontrolled draws by adjusting laser power and the vertical scan path alone. As the hot glass was reduced in diameter it remained centered in the most intense portion of the laser beam, and the glass would eventually draw at an uncontrollable rate no matter how low the laser power was set. The inventor discovered that when the center of the laser beam was moved toward the edge of the glass both of these problems were greatly reduced. Nonetheless because it is still necessary to evenly heat the glass to obtain good results, using a single off-center vertical scan alone does not produce good, controllable results. By employing a second (horizontal) scan axis the inventor was able to place two parallel scans on the glass displaced on either side of the center of the glass by a predetermined, programmable distance. Distributing the laser power in this way allows control over the relationship between the diameter of the glass and the effectiveness of the laser beam. By increasing the space between the two parallel vertical scans and reducing the degree to which they overlap, the laser power distribution can be spread such that it is not most intense at the central axis of the glass. This allows a controlled rate of draw over a wide range of laser power levels. The spacing of the parallel scans can be used to limit the reduction in diameter in a programmable fashion, and to eliminate the problem of uncontrolled draws. The parallel scans can be spaced so that the laser beam becomes ineffective once the glass draws down to the desired diameter.

Figure 6:
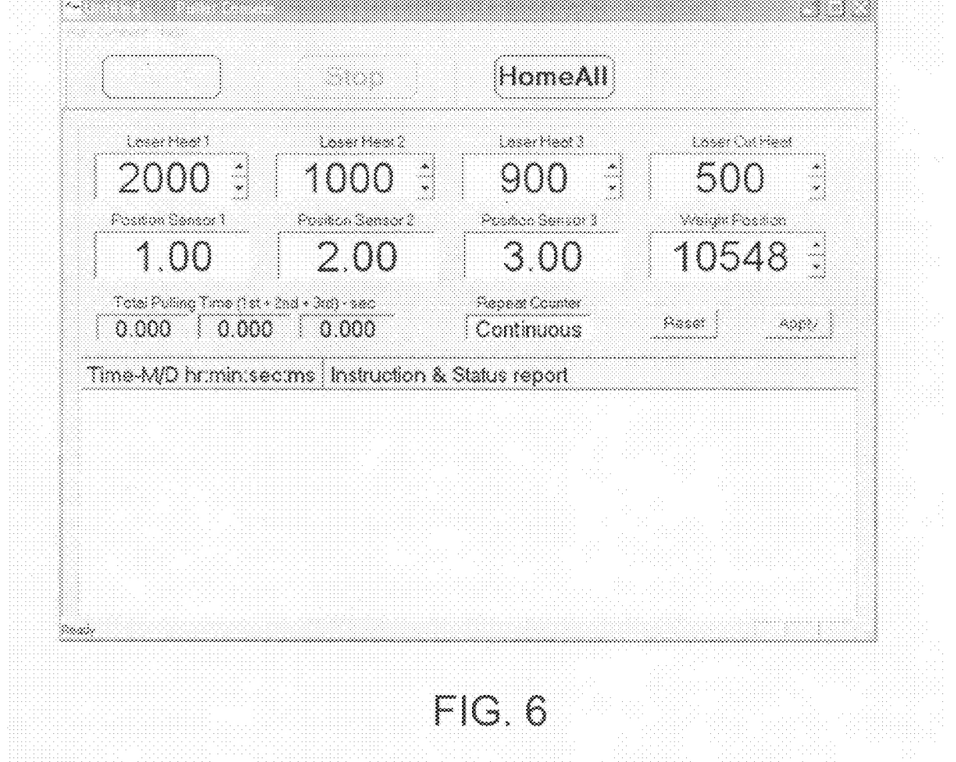
FIG. 6 is a screen shot of a graphical user interface for controlling aspects of an embodiment of the present invention.

A pipette drawing process using the embodiment of FIG. 1 is as follows: The top end of the pipette is clamped in the collet and the weight is installed on the bottom end. A weight lifter main is used to install the weight at the correct location on the glass tube. Once this has been done the weight lifter is removed to avoid interference with the weight during the drawing process. The position sensor determines that the weight is properly positioned and the first stage of the draw begins with the laser set to provide a first programmed set of scan parameters. After the glass has become sufficiently soft it begins to draw down. Preferably, when the weight position sensor signal indicates that the weight has moved down by a predetermined distance, a second programmed scan pattern is implemented. For example, when the weight has moved down the predetermined distance, the laser power is gradually ramped down to a lower value. In one embodiment, the second heating stage uses the same scan parameters as the first stage, only the laser power is reduced. In accordance with one embodiment of the invention, the user interface, as shown in FIG. 6, provides up to the three heat settings. Each heat setting also has a draw distance setting entered by the user. The draw is measured by the displacement sensor. The laser heat values may be selected by the user to provide a controlled rate of draw. For example, while it is advantageous to initially apply a high heat level to quickly soften the glass, if the heat is kept too high after it has been softened the glass may draw too fast, which may cause curved or off-center tapers. Thus, the user can control the proper sequencing of the various stages of the pull. As depicted in FIG. 6, the user can preselect various heat level which are implemented in sequence as the draw progresses over the programmed distances. In addition, the user can, preferably, control the position and movement of the scan center, the length of the vertical and horizontal scans, and the rotation speed of the pipette. Note that controlling the length of the horizontal scans determines the offset between the beam position as it is scanned vertically and pipette central axis $20_C$. While each of the parameters is, preferably, user selectable, the system may include default parameters and various recipes (i.e., specific combinations of preset parameters). Once the draw is complete the weight lifter is positioned just below the weight in order to allow it to catch the weight and the lower pipette, which is still attached to the weight. The pipette is removed from the weight and the weight lifter is ready to start again.

The various program parameters may be adjusted by the user to obtain desired results. The basic requirements are to use a combination of parameters that: (1) allows the glass to melt in a reasonable period of time, but without causing the glass to draw too fast for proper control; (2) produces a desired glass profile; and (3) allows the draw to proceed to completion. The pipette being drawn, i.e., the starting pipette, can be made of any of several different types of glass, and can be selected to have a variety of inner and/or outer diameters. Likewise, different uses of the drawn pipettes require different desired end profiles (e.g., degree of taper, tip diameter, etc.). Because of the combinations are nearly limitless, it is not possible to provide one universal set of operational parameters; but the foregoing considerations must always be part of the process of selecting and adjusting parameters. Those skilled in the art appreciate that routine optimization is required to obtain a desired end product from a given type of starting pipette.

It is noted that the parameters interact strongly. Most program parameters have a direct effect on the heating of the glass. It will be understood, based on the foregoing discussion, that the influence of the program parameters on the pulling process is primarily by controlling the distribution of heat within the glass tube.

Heat settings: The HEAT setting, i.e., the setting of the beam intensity, is a direct determinant of the rate of heating of the glass. This setting must be sufficient to soften the glass within a reasonable amount of time for production efficiency. Initial heating cycle times as long as 5 minutes may be used if that is considered acceptable in terms of efficiency. However, the application of excessive heat will cause the glass soften to the point that it draws too quickly for good control. Heating times less than 10 seconds are likely problematic, [for example, the glass may draw so fast that the ramp-down from HEAT 1 to HEAT 2 is not complete before the next stage has been reached (i.e., the glass has already been pulled to the point which triggers another adjustment of parameters). This will result in a loss of proper program control since the glass may draw past the correct position for starting the next phase of heating. Initial heating times longer than 30 seconds typically allow for good control. However, even when the heating periods are reasonably long it is possible to get a rapid and dramatic draw after the glass has drawn down to a fairly small diameter. In simple terms, the first heat must be enough to melt the glass in a reasonable period of time and the second heat must be enough to maintain a reasonable rate of draw. The weight position is adjusted to provide a smooth transition from the first heat to the second heat. If it is too high the glass will draw too fast for proper control. If it is not high enough the glass may stop drawing when the heat ramps down, as the second heat may not produce enough softening to continue the draw if the diameter of the glass has not been reduced sufficiently While the laser intensity ("HEAT") setting effects the rate the glass is softened, and thereby the rate of draw, other parameters influence softening of the glass. For example, the size of the scan pattern determines the length of glass heated by the laser. Longer vertical scans require use of a more intense laser beam in order to deliver the same power per unit length of tubing. Likewise, the degree of horizontal offset of the vertical scans from the pipette's central axis can affect the amount of heat delivered to the pipette. A greater offset from the central axis may mean the outer edge of the laser beam does not strike the pipette. Moving the scan (i.e., the position of the scan center) during the draw also affects the rate of the draw. Moving the scan may result in moving new (cool) glass into the zone of heating while heated glass moves out of the zone, slowing the draw rate. Moreover, the amount of laser heating required to soften the glass will depend significantly on the diameter of the glass as it is drawn.

The offset distance between pipette center axis $20_C$ and the center of laser beam 55 can be adjusted such that more of the laser beam will strike the pipette when it is wider (in its initial state) than after it has been drawn to narrowed diameter. Thus, as the glass is drawn down to a small diameter the proportion of the laser beam which intercepts the glass may be reduced, thereby slowing the rate of heating. In accordance with an aspect of the invention, offsetting the vertical scans of the laser from the central axis of the pipette is used to slow the rate of heating as the pipette is drawn to a narrower diameter. Specially, this feature of the invention can be used to prevent a runaway draw.

Experience has shown that the rate of rotation can also have an impact on the effectiveness of the heating. While this is not a primary control over the rate of heating, it must be expected that changing the rate of rotation will change the effective heating produced by the laser. A typical rate of rotation is one revolution per second (1 rps).

According to another aspect of the present invention, the scan size and movement of the scan can be adjusted as desired by the user to determine the geometry of the pulled pipette. Generally, wide scan patterns and extensive movement of the scan center tend to produce tapers that are more gradual and larger in diameter. This is due to the inclusion of a greater volume of glass in the drawing process with a wide scan or with a scan that moves during a pull. (As discussed above, heating a greater volume of glass requires additional laser power in order to produce a reasonable rate of draw.) Moving the scan center can be used to control the shape in two ways: (1) because of its impact on glass that is removed from the heating zone by the scan movement or (2) because of the glass kept in heating zone by the scan movement. Once a segment of glass has been heated enough to begin to draw, moving the laser beam off that segment will cause it to set at whatever reduced diameter has been reached. This is similar to what occurs with a fixed scan when glass draws out of the zone of heating. On the other hand, moving the scan down can be used to obtain different effects. For example, moving the scan at the same rate the glass is drawing, can reverse the asymmetry between the top and bottom ends of the taper. This moves the waist of the taper close to the bottom shoulder of the hourglass. Or, if the scan center were moved down at half of the rate of the glass draw, the hourglass waist will be in the middle and the upper and lower sections of the taper will be substantially similar. More generally, the waist of the hourglass will move away from the upper shoulder down to the lower shoulder as the rate of scan movement down is increased. Moving the scan up can also be used. As the scan moves up new glass is heated and the upper shoulder of the taper also moves up. This allows the waist of the taper is to be displaced farther from the upper shoulder. Although the taper tends to become longer and more gradual with both increased scan width and increased scan movement, these effects are far from additive. Scan movement has much more dramatic effects when the scan width is narrow.

Thus, according to the embodiment of FIG. 1 of the present invention, the scan center can be moved in either direction along the pipette and can be moved at different rates relative to the drawing of the glass in order to produce a variety of effects. By using laser heating, fast galvanometers for scanning the beam and a fast position sensor the system can keep up with a much higher rate of draw, one system can be used to produce a variety of results that previously required use of different drawing systems.

Figure 7:
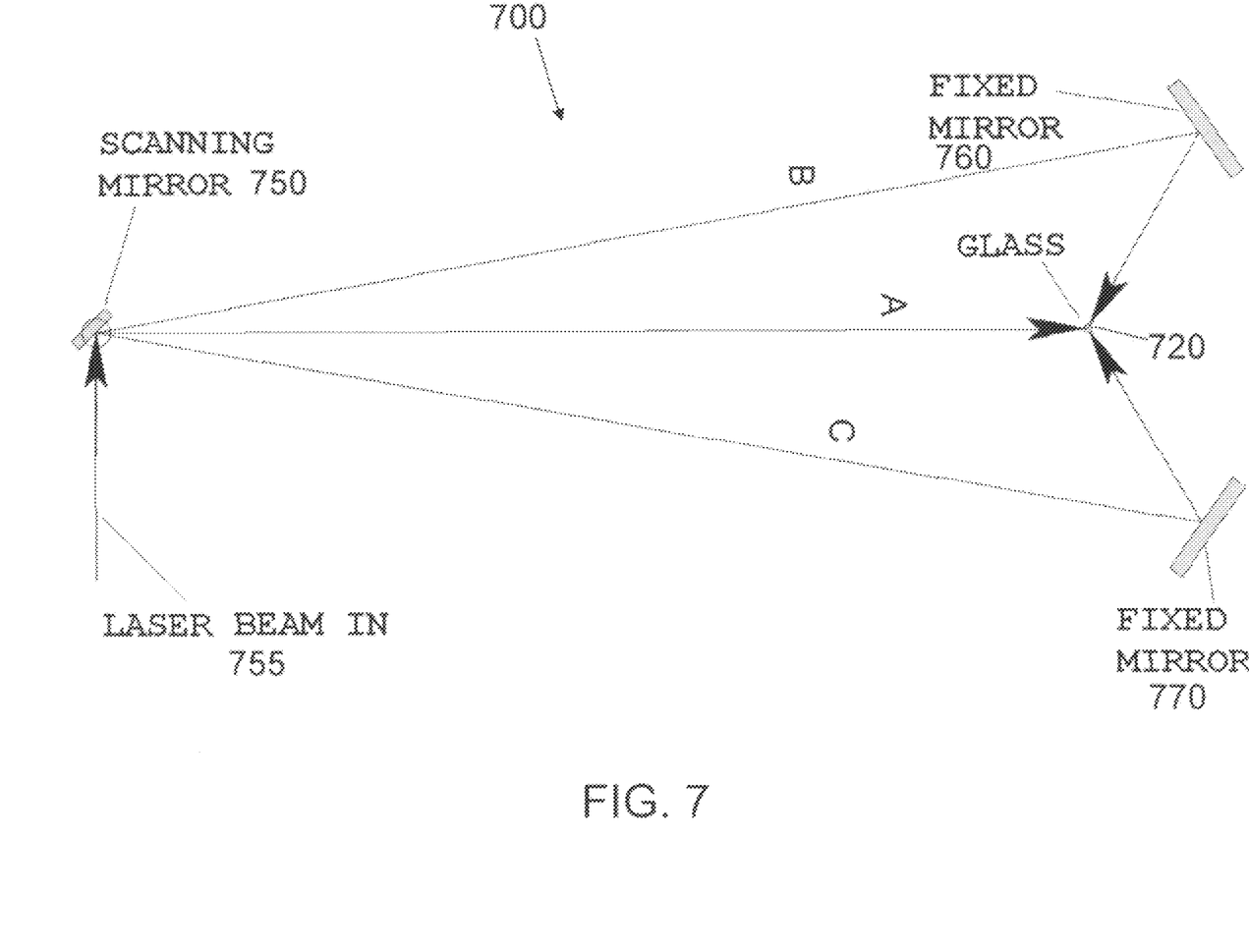
FIG. 7 is a schematic representation of a second embodiment of the present invention.

FIG. 7 is a schematic representation of a second embodiment of the present invention, comprising a pipette pulling system 700. Many of the components of system 700, such as the control system and laser, are the same as shown in FIG. 1 and have not been included in FIG. 7 for clarity. While system 700 can be either vertical or horizontal, as explained below, it eliminates the need to rotate the pipette during heating, and, therefore, is particular useful in horizontal systems where pipette rotation is usually avoided. As is known in the art, horizontal systems use two clamps, one at either end of the pipette, which must be carefully aligned and which provide adequate tension. In FIG. 7, pipette 720 is oriented perpendicular to the page. A laser beam 755 first strikes a scanning mirror 750, which can be rotated on two axes. Alternatively, as in the embodiment depicted in FIG. 2, two mirrors can be used to independently scan two axes. The beam from scanning mirror 750 can be directed directly onto the pipette along path A, or to mirrors 760 and 770 along paths B and C, respectively, which reflect the laser onto the pipette from different angles, as depicted. Preferably, mirrors 760 and 770 are fixed. In addition, scanning mirror 750 can scan the beam long the axis of the pipette, i.e., any of paths A, B and C can be moved up and down the length of the glass.

In a preferred embodiment, scanning the laser starts with the scanning mirror 750 set to place the beam on one of the fixed mirrors (760, 770) and scanning horizontally back and forth. The beam is then moved to the direct position "A" and scanned one way horizontally. Next the beam is moved to the other fixed mirror and scanned back and forth. Finally, the beam is returned to the direct position and scanned back across so that we can complete the cycle by moving back to the first mirror. This produces 2 horizontal scans in opposite directions for each of the three vertical positions in a completed cycle.

Like the embodiment of FIGS. 1-5, scanning mirror 750 can be controlled such that each scan along the predetermined length of pipette 720 is offset from the central axis of the pipette and there are a pair of vertical scans from each direction, one on either side of the central axis. In that case, a complete scan sequence comprises six scans, i.e., two each from directions A, B and C. (Of course, there would be slight differences in the position of the path of the beam for each of the scans in a particular direction.) Likewise, by controlling the scan mirror, the scan center may be moved along the length of the pipette, as discussed above.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, using a combination of scan movements in two axes, almost any scan pattern can be achieved. Accordingly, the disclosures and descriptions herein are not intended to be limiting of the scope of the invention, which is set forth in the following claims.

What is claimed is:

1. A pipette puller comprising:
   a laser for generating a light beam for heating a pipette, said pipette having an elongate central axis,
   an optical system for alternately scanning the laser beam in a first direction parallel to said central axis and in a second direction orthogonal to said central axis, whereby said pipette is heated and softened by said laser beam,
   a force-applying mechanism for applying a pulling force on the softened pipette,
   wherein said optical system is adapted to scan the laser beam on at least two paths that are parallel to but offset from said central axis.

2. A pipette puller comprising:
   a laser for generating a light beam for heating a pipette, said pipette having an elongate central axis,
   an optical system for alternately scanning the laser beam in a first direction parallel to said central axis and in a second direction orthogonal to said central axis to define a rectangular scan pattern on the pipette, whereby said pipette is heated and softened by said laser beam,
   a force-applying mechanism for applying a pulling force on the softened pipette, and
   a control system coupled to said optical system for moving the rectangular scan pattern along the length of the pipette as it is being pulled.

3. The pipette puller of claim 2 further comprising a position sensor for detecting stretching of the softened pipette, wherein said control system is adapted to use information from said position to move said rectangular scan pattern along the axis of the pipette as it is being pulled.

4. The pipette puller of claim 2 further comprising a drive mechanism for rotating the pipette while is being heated.

* * * * *